United States Patent

Jacobs

[15] 3,705,348
[45] Dec. 5, 1972

[54] METHOD OF AND AN APPARATUS FOR DETERMINING THE LENGTH OF FIBERS SUSPENDED IN A LIQUID

[72] Inventor: Gerardus Henricus Johannus Maria Jacobs, Proost Frederikstraat 21, Meerssen, Netherlands

[22] Filed: Dec. 21, 1970

[21] Appl. No.: 100,416

Related U.S. Application Data

[63] Continuation of Ser. Nos. 876,155, Dec. 4, 1969, and Ser. No. 682,789, Nov. 14, 1967.

[30] Foreign Application Priority Data

July 31, 1967  Netherlands ............................ 67105

[52] U.S. Cl. ............................ 324/71 R, 324/71 CP
[51] Int. Cl. ............................................. G01n 27/00
[58] Field of Search ........................ 324/71; 250/218

[56] References Cited

UNITED STATES PATENTS 2,779,232  1/1957  Small ................................. 250/218
3,390,326  6/1968  Imadate .............................. 324/61

FOREIGN PATENTS OR APPLICATIONS

40/5119  3/1965  Japan ............................. 324/71 CP

OTHER PUBLICATIONS

Hastings et al., Unicellular Marinine Organisms in Annals of the New York Academy of Sciences, Vol. 99, pp. 280–289 publ. by the Academy June 29, 1962, New York.

Primary Examiner—Alfred E. Smith
Attorney—Wenderoth, Lind & Ponack

[57] ABSTRACT

A method of measuring the length of fibers suspended in a liquid which, together with a physical flux, flows through the measuring opening of a measuring device. This device comprises a passage converging toward its exit, with a measuring opening provided at the narrowest point thereof, through which the fibers are passed at a high rate and are held in a stabilized condition without agglomeration and folding.

1 Claim, 3 Drawing Figures

PATENTED DEC 5 1972 3,705,348

GERARDUS HENRICUS JOHANNUS
MARIA JACOBS
INVENTOR.

BY Wenderoth, Lind &
Ponack. Atty's

METHOD OF AND AN APPARATUS FOR DETERMINING THE LENGTH OF FIBERS SUSPENDED IN A LIQUID

This application is a continuation of applications, Ser. No. 876,155, filed Dec. 4, 1969, and of Ser. No. 682,789, filed Nov. 14, 1967, both now abandoned.

This invention relates to a method of and an apparatus for determining the size of particles suspended in a liquid in a low concentration, wherein the suspension is passed through a flow passage which is narrow relative to said particles and through which at the same time a physical flux is passed, with respect to which the liquid has other properties of permeability than has the substance of the particles, so that the particles passing one after another through the path of the physical flux modify said flux, the period of time of the flux modifications being detected for determining the size of the particles.

In Netherlands Patent Specification No. 94.112 this method is described for counting the particles, which comprises counting the fluctuations of an electric current which is passed through the narrow flow passage. These fluctuations are created because the particles have a different electrical resistance from the liquid in which they are suspended, which, with respect to the electrical liquid resistance, results in a different value of the substitutional resistance in the electric current path if a particle moves therethrough.

In Netherlands Patent Specification No. 94.112 it is remarked that variations in the size of the particles influence the time and the form of the variations in the characteristic of the electric current, so that, reversely, the size of the particles can be found from these measuring data if the latter are compared to the corresponding measuring data for particles of known dimensions.

In Swiss Patent Specification No. 259.952 it is suggested for a similar purpose to use a beam of light as physical flux, which hits a photocell. Also in British Patent Specifications 679.711, 679.740 and 679.774 a similar photo-electric method is described.

Although the said measuring techniques have apparently been known since long, they have not been used for measuring very oblong particles, such as fibers which correlates with the problem of how to pass these oblong particles through a narrow flow passage, without their becoming agglomerated and folded.

The length of the fibers of a paper material plays an important part for the properties of the paper to be made from these fibers. None the less the length of the fibers does not play a special part as parameter in controlling the manufacture of the paper material, which hiatus in the process control technique is apparently caused by the fact that a rationally and a rapidly applicable method and apparatus, which provide sufficiently precise information, are not available for determining the length of the fibers.

It is an object of the present invention to provide an appropriate method of and apparatus for determining the length of the fibers, which comprises employing the principle described in the beginning of this specification in order for a number of fibers (about 2000) required for a statistical division of the fiber length to be measured for their lengths in a relatively short period of time, the fibers not being exposed to mechanical interactions which might cause agglomeration and clogging of the measuring opening. A special difficulty which is to be overcome in this respect is that the fibers must be prevented from folding. This folding may easily occur in a narrow flow passage owing to the distribution of the speed in the flowing liquid.

A mathematical analysis of the phenomena in this flow leads to the conclusion that these phenomena are very complex, for which reason only a simple phenomenologic approximation of a fiber behavior is given to illustrate the lability of that behavior in badly selected conditions. The rate of flow in a narrow tube is equal to nil adjacent the walls of the tube and is maximal in the center. If the leading end of a stretched fiber which is entrained in the center lies somewhat off the center of the path of flow, which may easily happen with the hardly ever straight fibers, this leading end is retarded relative to the central portion of the fiber by the liquid flowing more slowly, which at once introduces rotation of the fiber about a transverse axis, and this rotation intensifies the deviation of the leading end from the path of travel, so that the central portion is subjected to a greater drawing force in the liquid than the ends of the fiber. In a narrow tube this has immediately for a consequence that the fiber is folded.

This difficulty is even more strongly felt in the case of a high grinding degree of fibrous paper material, owing to which the fibers are softer and more fibrillated.

It has been achieved by this invention that a fibrous suspension is passed at a high rate through a passage which is gradually converging towards the exit, the arrangement being such that the fibers of the suspension are longitudinally oriented and maintained in the direction of flow and then conducted through the path of the physical flux flowing through the measuring opening.

It has surprisingly been found that the fibers, lengthwise stretched in the direction of flow, indeed pass through the measuring opening after the manner referred to. It is thought that the stabilizing influence of the convergence of the lines of flow in the conically converging passage is favorable, and that, in view of the necessity for the liquid flow to satisfy the continuity equation, the strong rapid flow towards the top of the conical passage results in an elongation of the fibers in the direction of flow.

To keep the risk of clogging of the measuring opening as low as possible, it was desirable to adjust the rate in the measuring opening to at least 5 m/sec, and to make the diameter of the measuring opening at least twice the thickness of the fibers.

The percentage influence of the fiber in the measuring opening on the electrical resistance therein is higher according as the fiber occupies a portion of the volume in said opening. With the above-mentioned values, however, the electrical measurement appeared to be possible with an adequately low noise level.

In order to keep the rate of flow in the measuring opening, which is of course the basis for determining the length, substantially constant, the inflow may, for example, take place from a buffer reservoir of such a width that the level does not change much during the measurement. Also it is possible to apply gas pressure above said level.

For the length of the fibers to be measured, it is desirable for the route within the measuring opening to be as short as possible. Good results were obtained with the measuring opening having an axial length of 0.2 mm. The apex of the conical measuring tube was 8°, the length of the tube 150 mm.

One embodiment of this invention will now be described, by way of example, with reference to the accompanying drawings, in which.

The electrodes 1 and 2 are molten or cemented in a cone 3 of synthetic material, opposite each other and on both sides of the passage of flow at the narrowest point thereof. In this embodiment the measuring opening is no longer round but somewhat levelled to improve the uniformity of the electric field. The diameter of the round portion of the measuring opening is 0.5 mm, the width of the electrodes 0.3 mm, and their thickness in axial direction is 0.2 mm. The electrodes may be of silver or silverplated copper; in a direct current circuit preferably platinum electrodes are used. The inner walls of the cone and the measuring passage are finished as smoothly as possible.

As soon as the fibers pass the measuring opening they will effect a change in the resistance of the liquid column between the electrodes on account of their conductivity differing much from the liquid, which is an electrolyte having a favorably selected concentration. Hence the current, which remains constant, delivers a voltage impulse to the electrodes, which can be rendered visible on an oscilloscope screen. If desired, the impulses can be recorded on a film or the like by the well-known means.

With a constant rate of flow, the length of the impulse curve, which is in principle rectangular, is a measure for the length of the fibers, the height for the thickness. Any passing fibers that are folded yet are indicated by a greater height of the curve, and so are any overlapping fibers.

It is desirable to calibrate the apparatus by means of fibers of known dimensions because of the small dimensions, due to which the influence of minor differences in dimensions is relatively large. Also, measures are to be taken for keeping the temperature constant or for the electrical temperature compensation, in connection with the conductivity of the electrolyte.

One measuring method is that, after the voltage impulses created by the fibers passing through the measuring opening have been amplified, they are passed through a threshold circuit, which circuit has an adjustable filtering voltage level, so that only that impulse is counted which reaches or exceeds that adjusted level. Thus each counting of the impulses represents the number of particles having a diameter larger than the selected threshold value in a given suspension volume.

For the establishment of the length division curve the signal, after the amplifier, can be sent through a circuit including an amplitude limiter to convert the impulses into a series of rectangular signals of specific height. These signals are then integrated, the ultimate height being a measure for the length of the initially rectangular signal. In the same manner as described hereinbefore, these signals are passed through a threshold circuit and rendered visible on an oscilloscope screen, and recorded, if so desired.

By calibration the set threshold value and the fiber diameter or fiber length can be brought into connection.

Figure 1:
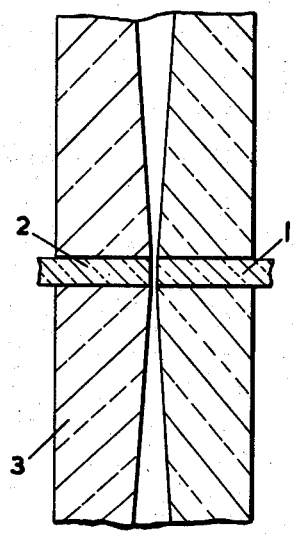
FIG. 1 is a longitudinal section of the central portion of a measuring tube according to this invention.
Figure 2:
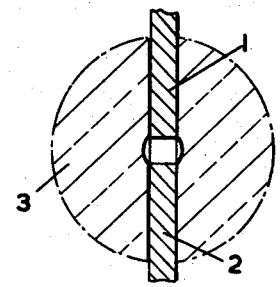
FIG. 2 is a cross-section of the narrowest part of the measuring tube.
Figure 3:
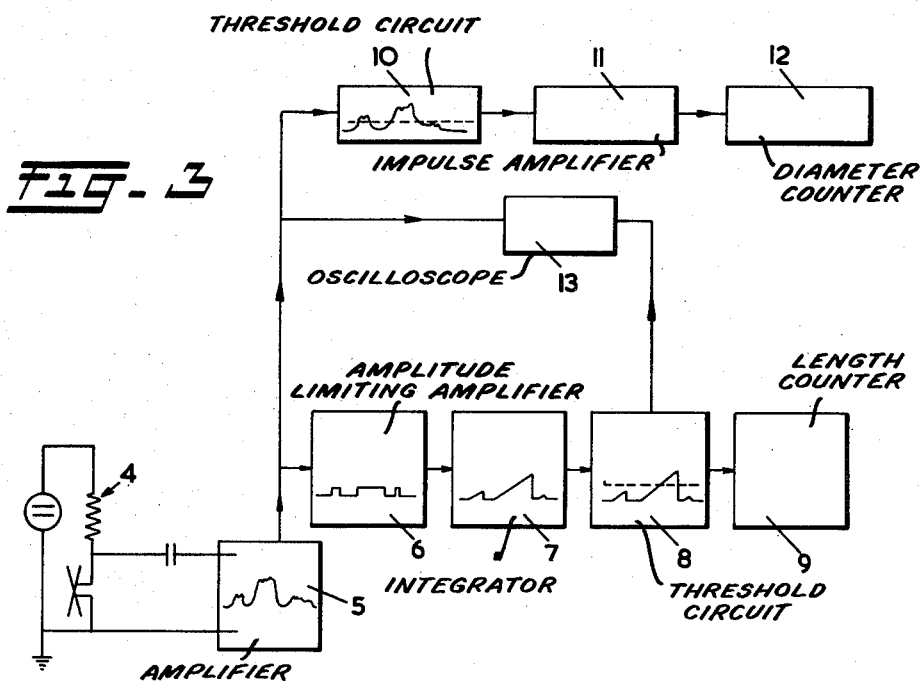
FIG. 3 is an electrical diagram.

In the block diagram in FIG. 3 all this is shown. In this diagram 4 is a voltage feed, 5 an amplifier, 6 an amplitude limiting amplifier, 7 an integrator, 8 a threshold circuit, 9 a "length" counter, 10 a threshold circuit, 11 an impulse amplifier, 12 a "diameter" counter, and 13 an oscilloscope.

When a direct current circuit is applied, more precise measuring results are obtained, which, in addition, prevents the difficulty connected with the use of alternating current owing to the high frequency which is required if the number of impulses is to be used as a measure for the length at the necessary rate of flow. In the direct current circuit the electrodes must be of platinum to prevent electrolysis of the electrolyte. Application of a direct current also allows of a simpler design of the electrodes.

In experiments favorable results were obtained with 2 platinum plates as electrodes, separated from each other by an insulation of a thickness of 0.2 mm, the assemblage being pierced by a hole of 0.3 mm.

As electrolyte a physiological saline was used.

The maximum current that appeared to be maintainable had a value of $60 \mu A$, so that the error in favor of any gas development can be neglected. The direct current voltage applied was 1.8 V.

The matching resistance of the amplifier was 30 K ohm, while the direct current voltage was blocked by way of a capacitor.

The responsiveness of the present amplifier was 2.8 mV, which meant that the charge impulse of the capacitor had to have this value in order that the amplifier would reach its full capacity. This input voltage was amplified about 500 times and transferred to a block form through a Schmitt trigger to make a Decade counter responsive.

A concentration of the suspension of about 0.0002 percent corresponding with about 15 – 250 fibers per ml, in dependence of the length of the fibers, turned out to be low enough to prevent interaction among the fibers, and thus to prevent agglomeration.

Naturally, it is also possible in principle to measure the lengths of the fibers by means of a beam of light as the physical flux passing through the measuring opening. To this end the light permeating properties of fibers can be diminished by dyeing. The principle of the conical measuring tube according to this invention is applied in this method as well.

I claim

1. A method for determining the length of fibers suspended in a liquid in a low concentration comprising the steps of:

passing said suspension through a conically converging portion of a flow tube from a wider entrance end to a narrower measuring exit end having a diameter at least twice the thickness of said fibers, at a fast rate so that said fibers individually pass out of said measuring end longitudinally oriented, passing an electrical flux through said suspension as said suspension passes said measuring exit,
detecting variations in said flux, and
employing the detected variations to determine the length of said fibers.

* * * * *